US012291668B2

(12) United States Patent
Li et al.

(10) Patent No.: US 12,291,668 B2
(45) Date of Patent: May 6, 2025

(54) COATED RUBBER PARTICLE, ITS PREPARATION AND APPLICATION THEREOF

(71) Applicants: CHINA PETROLEUM & CHEMICAL CORPORATION, Beijing (CN); SINOPEC OILFIELD SERVICE CORPORATION, Beijing (CN); SINOPEC SHENGLI PETROLEUM ENGINEERING CO., LTD, Shandong (CN); DRILLING TECHNOLOGY RESEARCH INSTITUTE OF SINOPEC SHENGLI PETROLEUM ENGINEERING CO., LTD., Shandong (CN)

(72) Inventors: Gongrang Li, Shandong (CN); Wenbo Li, Beijing (CN); Bingxiang Sun, Beijing (CN); Hui Tian, Shandong (CN); Xizhou Wang, Beijing (CN); Ke Li, Shandong (CN); Jianghong Jia, Shandong (CN); Lei Yu, Shandong (CN); Jie Sun, Shandong (CN); Xudong Wang, Shandong (CN); Chengjun Wang, Shandong (CN); Bingtai Li, Shandong (CN); Haibin Li, Shandong (CN); Zhendong Liu, Shandong (CN); Kai Gao, Shandong (CN); Chunguang Li, Dongying Shandong (CN); Hui Li, Shandong (CN)

(73) Assignees: CHINA PETROLEUM & CHEMICAL CORPORATION, Beijing (CN); SINOPEC OILFIELD SERVICE CORPORATION, Beijing (CN); SINOPEC SHENGLI PETROLEUM ENGINEERING CO., LTD, Shandong (CN); DRILLING TECHNOLOGY RESEARCH INSTITUTE OF SINOPEC SHENGLI PETROLEUM ENGINEERING CO., LTD, Shandong (CN)

(*) Notice: Subject to any disclaimer, the term of this patent is extended or adjusted under 35 U.S.C. 154(b) by 166 days.

(21) Appl. No.: 17/997,074

(22) PCT Filed: Feb. 4, 2021

(86) PCT No.: PCT/CN2021/075349
§ 371 (c)(1),
(2) Date: Oct. 25, 2022

(87) PCT Pub. No.: WO2022/165726
PCT Pub. Date: Aug. 11, 2022

(65) Prior Publication Data
US 2023/0242804 A1    Aug. 3, 2023

(30) Foreign Application Priority Data

Feb. 2, 2021   (CN) .......................... 202110140380.9
Feb. 2, 2021   (CN) .......................... 202110140385.1
Feb. 2, 2021   (CN) .......................... 202110145837.5

(51) Int. Cl.
*C09K 8/42*        (2006.01)
(52) U.S. Cl.
CPC ..................................... *C09K 8/42* (2013.01)
(58) Field of Classification Search
CPC ...... C09K 3/12; C09K 3/1006; C09K 3/1009; C09K 2003/1034; C09K 2003/1053;
(Continued)

(56) References Cited

U.S. PATENT DOCUMENTS

| | | | | |
|---|---|---|---|---|
| 4,862,967 A | * | 9/1989 | Harris | ................. E21B 33/1208 166/387 |
| 2008/0157486 A1 | * | 7/2008 | Kuzawa | ............ B29D 99/0053 277/650 |

(Continued)

FOREIGN PATENT DOCUMENTS

| | | | |
|---|---|---|---|
| CN | 101128312 A | | 2/2008 |
| CN | 108949104 A | * | 12/2008 |

(Continued)

OTHER PUBLICATIONS

Translation CN 108949104 A (Year: 2018).*
(Continued)

*Primary Examiner* — Hoa (Holly) Le
(74) *Attorney, Agent, or Firm* — NKL Law; Allen Xue

(57) ABSTRACT

Disclosed is a coated rubber particle, preparation thereof and its application as a plugging material in drilling fluids. The
(Continued)

coated rubber particle comprises a rubber core and a coating layer, wherein the core has a fluorine content (at %) of 0-15%, the coating layer has a fluorine content (at %) of 30-80%, and the coated rubber particle has a 24-hour oil absorption rate of 4% or less. The coated rubber particle has good oil resistance, and is particularly suitable for use as a plugging material in drilling fluids, particularly oil-based drilling fluids.

12 Claims, 2 Drawing Sheets

(58) Field of Classification Search
CPC .. C09K 2208/00; C09K 2208/10; C08K 8/92; C08K 8/426; Y10T 428/2991; Y10T 428/2998; B32B 5/16; B32B 5/22; B32B 5/30; B32B 7/00; B32B 9/04; B32B 9/041; B32B 9/045; B32B 9/048
See application file for complete search history.

(56) References Cited

U.S. PATENT DOCUMENTS

| | | |
|---|---|---|
| 2010/0193244 A1 | 8/2010 | Hoskins |
| 2019/0153290 A1 | 5/2019 | Katou et al. |

FOREIGN PATENT DOCUMENTS

| | | |
|---|---|---|
| CN | 104558375 A | 4/2015 |
| CN | 111875814 A | 11/2020 |
| WO | 2005061409 A1 | 7/2005 |

OTHER PUBLICATIONS

Benning, Oilfield Requirements and Drilling Fluid Influence on Elastomers, KHK—11th Fall Rubber Colloquium (Year: 2014).*
Non-Black Fillers For Rubber—RT Vanderbilt Company, Inc., Sep. 1, 2013 (Year: 2013).*
Fillers for Rubber Compounds—Non Black—CWC—May 1997 (Year: 1997).*

* cited by examiner

COATED RUBBER PARTICLE, ITS PREPARATION AND APPLICATION THEREOF

TECHNICAL FIELD

The present application relates to the technical field of well drilling. Particularly, the present application relates to a coated rubber particle, its preparation and application thereof as a plugging material in drilling fluid.

BACKGROUND ART

In recent years, with the progress of oil and gas exploration and development, the number of deep wells and complex stratum wells is gradually increasing, and various complex accidents are frequently encountered during drilling construction processes, especially the problem of well leakage is more prominent. The number of wells having a leakage problem, the leakage amount and leakage time are all at a high level, and the leakage plugging effect is poor. Consequently, a huge economic loss is caused, and the process of exploration and development is greatly delayed.

At present, commonly used plugging materials may be mainly classified as bridging-type plugging materials, high-water-loss plugging materials, temporary plugging materials for protecting production zones, chemical plugging materials, inorganic gelling plugging materials, soft (hard) plug type plugging materials and the like, depending on the working mechanisms and functions. The use of such plugging materials reduces the loss caused by well leakage to some extent.

SUMMARY OF THE INVENTION

The inventors of the present application find that in the current shale oil and gas development process, oil-based drilling fluid is usually used, and well leakage often occurs due to the special geological structure and lithologic development characteristics of shale stratum, but the current oil-based drilling fluid leakage plugging operation is short of specialized oil-based drilling fluid leakage plugging materials, and conventional water-based drilling fluid leakage plugging materials are still used. However, some elastic leakage plugging materials for water-based drilling fluid have oil solubility, that is can be dissolved in the oil-based drilling fluid, and thus do not have pressure-bearing leakage plugging property, which render them not suitable for oil-based drilling fluid leakage plugging. The inventors of the present application also find that the plugging material of water-based drilling fluid is mostly a hydrophilic material, which has poor compatibility with the oil-based drilling fluid, and is susceptible to the invasion of the drilling fluid, and therefore the plugging effect may be affected or the performance of the drilling fluid may be reversely affected, thereby causing complex underground accidents. The inventors of the present application further find that the plugging particles with elastoplasticity usually have oil solubility, and even the oil-resistant rubber will be partially dissolved when soaked in the oil-based drilling fluid for a long time, and then the properties of the rubber such as strength and elasticity will be reduced, and effective plugging cannot be formed or re-leakage may be caused in the drilling process. Therefore, no plugging product with high strength, oil resistance and elastoplasticity can be found in the prior art. The present application has been completed based on these findings.

Particularly, the present application relates to subject matters of the following aspects.

1. A coated rubber particle, comprising a rubber core and a coating layer, wherein the core has a fluorine content (at %) of 0-15% (preferably 0-8%), the coating layer has a fluorine content (at %) of 30-80% (preferably 40-65%), and the coated rubber particle has a 24-hour oil absorption rate of 4% or less (preferably 3% or less, more preferably 1.5-2.5%).

2. The coated rubber particle described in any one of the preceding or subsequent aspects, wherein the ratio of the content (at %) of high-valence metal in the coating layer to the content (at %) of high-valence metal in the core is 1 to 10 (preferably 1.2 to 3), and/or the high-valence metal is at least one selected from the group consisting of aluminum, calcium, titanium, magnesium, barium, and silicon (preferably at least one selected from the group consisting of calcium and silicon, particularly calcium), and/or the coating layer has a high-valence metal content (at %) of 0.15-0.50% (preferably 0.20-0.30%), and/or the core has a high-valence metal content (at %) of 0.05-0.2% (preferably 0.10-0.15%), and/or the coating layer has a metal-to-carbon ratio A (atomic ratio) of 0.003 to 0.01 (preferably 0.004 to 0.008), and/or, the core has a metal-to-carbon ratio B (atomic ratio) of 0.0008 to 0.003 (preferably 0.001 to 0.002), and/or the ratio of the metal-to-carbon ratio A to the metal-to-carbon ratio B is 2 to 13 (preferably 3 to 6), and/or the coating layer has a fluorine-to-carbon ratio (atomic ratio) of 1 to 3 (preferably 1.2 to 1.8), and/or the core has a fluorine-to-carbon ratio (atomic ratio) of 0 to 0.25 (preferably 0 to 0.12).

3. The coated rubber particle described in any one of the preceding or subsequent aspects, wherein the rubber is at least one selected from the group consisting of natural rubber, synthetic rubber, and composites thereof, and/or the coating layer comprises an inorganic particle (preferably an inorganic nanoparticle, particularly at least one selected from the group consisting of calcium carbonate nanoparticle, silica nanoparticle, alumina nanoparticle, and silica-alumina nanoparticle), and/or the coating layer comprises a fluoropolymer (preferably a fluorinated polyolefin, particularly at least one selected from the group consisting of tetrafluoroethylene homopolymer, tetrafluoroethylene copolymer, vinylidene fluoride homopolymer, vinylidene fluoride copolymer, hexafluoropropylene homopolymer, and hexafluoropropylene copolymer).

4. The coated rubber particle described in any one of the preceding or subsequent aspects, wherein the weight ratio of the inorganic particle to the core is 0.01 to 0.12 (preferably 0.02 to 0.05), and/or the weight ratio of the fluoropolymer to the core is 0.015 to 0.06 (preferably 0.025 to 0.04), and/or the coated rubber particle has an average particle size of 0.5 to 20 mm (preferably 1 to 5 mm), and/or the inorganic particle has an average particle size of 10 to 500 nm (preferably 50 to 300 nm or 50 to 200 nm), and/or the coating layer has such a thickness that the 24-hour oil absorption rate of the coated rubber particle is reduced by 20% or more (preferably by 30% or more, more preferably by 35-60%) as compared to the case without the coating layer, preferably, the coating layer has a thickness of 0.05 to 500 micrometers (preferably 1 to 300 micrometers or 20 to 200 micrometers), and/or the 24-hour oil absorption rate of the coated rubber particle is reduced by 20% or more (preferably by 30% or more, more preferably by 35-60%) as compared to the case without the coating layer.

5. A method for producing a coated rubber particle, comprising the steps of:
   (1) providing a rubber particle, and
   (2) coating (preferably by spraying or sprinkling) the rubber particle with at least one (preferably both) selected from inorganic particle and fluoropolymer to obtain the coated rubber particle.

6. The method described in any one of the preceding or subsequent aspects, wherein the step (2) comprises:
   (2-1) performing the coating (preferably by spraying or sprinkling) with the inorganic particle, with or without drying thereafter (preferably without drying), and (preferably then),
   (2-2) performing the coating (preferably by spraying or sprinkling) with said fluoropolymer, with or without drying thereafter (preferably without drying).

7. The method described in any one of the preceding or subsequent aspects, wherein the fluoropolymer is a fluorinated polyolefin, particularly at least one selected from the group consisting of tetrafluoroethylene homopolymer, tetrafluoroethylene copolymer, vinylidene fluoride homopolymer, vinylidene fluoride copolymer, hexafluoropropylene homopolymer and hexafluoropropylene copolymer, and/or the inorganic particle is an inorganic nanoparticle, particularly at least one selected from the group consisting of calcium carbonate nanoparticle, silica nanoparticle, alumina nanoparticle and silica-alumina nanoparticle, and/or the rubber is at least one selected from the group consisting of natural rubber, synthetic rubber and composites thereof, and/or the rubber particle has an average particle size of 0.5 to 20 mm (preferably 1 to 5 mm), and/or the inorganic particle has an average particle size of 10 to 500 nm (preferably 50 to 300 nm or 50 to 200 nm), and/or the rubber particle comprises waste rubber particle.

8. The method described in any one of the preceding or subsequent aspects, wherein the inorganic particle is used in the form of a coating composition comprising the inorganic particle (referred to as an inorganic coating composition), and/or the fluoropolymer is used in the form of a coating composition comprising the fluoropolymer (referred to as a fluorine-containing coating composition).

9. The method according to any one of the preceding or subsequent aspects, wherein the inorganic coating composition comprises the inorganic particle, a binder (preferably a polymer emulsion, particularly at least one selected from the group consisting of polyacrylate-based emulsion, polyvinyl acetate-based emulsion, ethyl α-cyanoacrylate emulsion, epoxy resin emulsion, polyurethane emulsion, and rosin emulsion, more particularly a polyvinyl acetate-based emulsion), optionally a coupling agent (preferably a silane coupling agent, more preferably at least one selected from vinyl tri-(C1-6 alkoxy) (preferably tri-(C1-4 alkoxy)) silanes, particularly at least one selected from the group consisting of vinyltriethoxysilane, vinyltrimethoxysilane, and vinyl tri-(β-methoxyethoxy)silane), optionally a wetting agent (preferably at least one selected from polyethylene glycol, alkyl sulfate, organic sulfonate, and polyoxyethylene ether, more preferably at least one selected from the group consisting of polyethylene glycol and alkyl sulfate), optionally a dispersant (preferably at least one selected from the group consisting of polyacrylates, cellulose derivatives, polyacrylamides and polyoxyethylene ether phosphates, more preferably sodium cellulose sulfate), and optionally a vehicle (preferably water), and/or the fluorine-containing coating composition comprises the fluoropolymer, a dispersant (preferably a surfactant, particularly at least one selected from the group consisting of potassium perfluorooctyl sulfonate and ammonium perfluorooctanoate, more preferably potassium perfluorooctyl sulfonate) and a vehicle (preferably water).

10. The method according to any one of the preceding or subsequent aspects, wherein the inorganic coating composition comprises, in parts by weight, 10 to 50 parts by weight (preferably 15 to 25 parts by weight) of the inorganic particle, 10 to 30 parts by weight (preferably 20 to 30 parts by weight) of the binder, 0 to 10 parts by weight (preferably 2 to 5 parts by weight) of the optional coupling agent, 0 to 10 parts by weight (preferably 2 to 5 parts by weight) of the optional wetting agent, 0 to 10 parts by weight (preferably 2 to 5 parts by weight) of the optional dispersant, and 0 to 10 parts by weight (preferably 2 to 5 parts by weight) of the optional vehicle, and/or the fluorine-containing coating composition comprises, in parts by weight, 3 to 15 parts by weight (preferably 5 to 10 parts by weight) of the fluoropolymer, 1-8 parts by weight (preferably 1-3 parts by weight) of the dispersant and 20-50 parts by weight (preferably 25-40 parts by weight) of the vehicle.

11. The method according to any one of the preceding or subsequent aspects, further comprising a wetting step between the step (1) and the step (2), in which step the rubber particle is treated (preferably by spraying or sprinkling) with a wetting agent (preferably at least one selected from carboxylic acids and alcohols, more preferably at least one selected from water-soluble carboxylic acids and water-soluble alcohols, particularly at least one selected from C1-6 monocarboxylic or polycarboxylic acids and C1-6 monohydric or polyhydric alcohols, more particularly at least one selected from acetic acid and glycerol), and then dried or not dried (preferably not dried).

12. The method described in any one of the preceding or subsequent aspects, wherein the wetting agent is used in the form of a composition comprising the wetting agent (referred to as a wetting agent composition), and the wetting agent composition comprises the wetting agent and water.

13. The method according to any one of the preceding or subsequent aspects, wherein the wetting agent composition comprises, in parts by weight, 2 to 15 parts by weight (preferably 3 to 10 parts by weight) of the wetting agent and 98 to 85 parts by weight (preferably 90 to 97 parts by weight) of water, and/or the weight ratio of the wetting agent to the rubber particle is 0.01 to 0.05 (preferably 0.02 to 0.035).

14. The method described in any one of the preceding or subsequent aspects, wherein the operating conditions of the step (2-1) include: performing by spraying or sprinkling, using an ultrasonic vibration sieve, an operation temperature of 40-85° C. (preferably 45-70° C. or 55-60° C.), an ultrasonic frequency of 5-100 KHZ (preferably 10-50 KHZ or 20-30 KHZ), a vibration frequency of 10-100 HZ (preferably 25-75 HZ or 45-55 HZ), an air pressure of the spray gun controlled to 0.1-0.5 MPaG (preferably 0.2-0.3 MPaG), a nozzle diameter of 2-20 mm (preferably 5-10 mm), and/or, the operating conditions of the step (2-2) include: performing by spraying or sprinkling, using a vibration sieve, an operation temperature of 20-45° C. (preferably 30-35° C.), a vibration frequency of 10-100 HZ (preferably 25-75 HZ or 45-55 HZ), an air pressure of the spray gun controlled to 0.1-0.5 MPaG (preferably 0.2-0.3 MPaG), and a nozzle diameter of 2-20 mm (preferably 5-10 mm), with no ultrasonic or an ultrasonic frequency of 5-100 KHZ (preferably 10-50 KHZ or 20-30 KHZ).

15. The method described in any one of the preceding or subsequent aspects, wherein the weight ratio of the inorganic particle to the rubber particle is 0.01 to 0.12 (preferably 0.02 to 0.05), and/or the weight ratio of the fluoropolymer to the rubber particle is 0.015 to 0.06 (preferably 0.025 to 0.04).

16. A drilling fluid composition (preferably an oil-based drilling fluid composition), comprising a plugging material and a base slurry (such as at least one selected from the group consisting of white oil based drilling fluid base slurry, diesel based drilling fluid base slurry and synthetic based drilling fluid base slurry), wherein the plugging material comprises or is the coated rubber particle described in any one of the preceding or subsequent aspects or obtained by the method described in any one of the preceding or subsequent aspects.

17. The drilling fluid composition described in any one of the preceding or subsequent aspects, wherein the coated rubber particle is present in an amount of 2-12 wt % (preferably 3-8 wt %), based on the total amount of the drilling fluid composition taken as 100 wt %.

TECHNICAL EFFECTS

Figure 1:
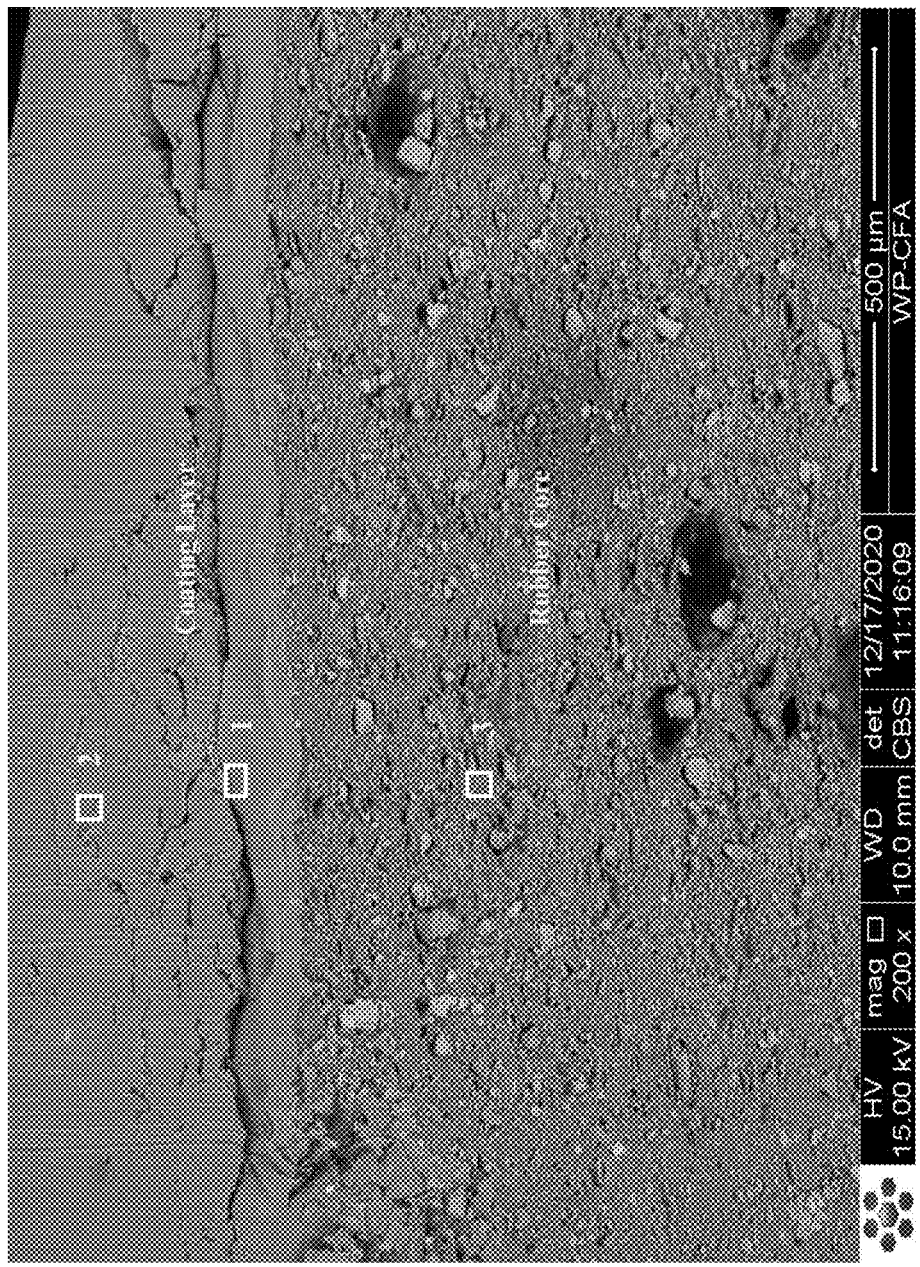
FIG. 1 shows an SEM image of the coated rubber particle obtained in Example 5.

Compared with the plugging material disclosed in the prior art, the coated rubber particle of the present application has better oil resistance and higher strength, and show good elastic deformation capability and plugging performance after soaking in oil-based drilling fluid under high-temperature and high-pressure conditions for a long time. Therefore, due to its pressure and temperature deformation capacity, a stacking plugging layer can be effectively formed in the formation fractures and pore throats, so that the fractures and the leakage formation can be effectively plugged.

Under downhole conditions, the rubber core of the coated rubber particle of the present application is deformable and the coating layer (particularly inert particles) coated on the surface of the rubber core will not be peeled off but be tightly adhered to the surface of the rubber core, thereby preventing the core of the rubber particle from being dissolved in the oil phase.

In the coated rubber particle of the present application, the strength of the rubber core can be greatly enhanced due to the presence of the coating layer, especially in the case that the coating layer comprises an inorganic particle, so that the pressure bearing capacity of the rubber core can be improved.

The coated rubber particle of the present application may undergo an elastic deformation under the condition of elevated temperature or pressure and thus may be squeezed into holes and gaps to form a pressure-bearing plugging, and the coating layer can be adsorbed by and bonded to the stratum, so that its retention capacity can be improved, and a good performance for plugging the holes and gaps can be obtained.

DETAILED DESCRIPTION OF THE INVENTION

The present application will be illustrated in detail hereinbelow with reference to embodiments thereof, but it should be noted that the scope of the present application is not limited by those embodiments, but is defined by the appended claims.

All publications, patent applications, patents, and other references cited herein are incorporated by reference in their entirety. Unless defined otherwise, all technical and scientific terms used herein have the same meaning as commonly understood by those skilled in the art. In case of conflict, the contents described herein, including definitions, should prevail.

When a material, method, component, apparatus, or device described herein is modified by an expression "known to those skilled in the art", "commonly known in the art" or the like, it is to be understood that said material, method, component, apparatus, or device covers not only those conventionally used in the art at the time of filing the present application, but also those not commonly used at present but will become commonly known in the art to be suitable for a similar purpose.

In addition, all numerical ranges set forth herein are inclusive of their endpoints unless expressly stated otherwise. Further, when a numerical range, one or more preferred ranges, or a plurality of preferred upper limit values and preferred lower limit values are given for an amount, concentration, or other value or parameter, it is to be understood that all ranges formed by any pair of an upper limit of any range or any preferred value and a lower limit of any range or any other preferred value should be considered as explicitly disclosed herein, no matter whether such pairs of values are individually disclosed or not.

In the context of the present application, the term "substantially" means that a deviation acceptable or considered reasonable to those skilled in the art, such as within ±10%, within ±5% or within ±2%, is allowable to be present.

In the context of the present specification, the conditions for the measurement of the SEM image and the EDS spectrum include: a field emission scanning electron microscope (JEOL, Japan, model JSM-7200F), 10.0 KV, 5000 times of magnification, analyzing the surface of the sample using an energy spectrum scanner of the electron microscope, automatically calculating, generating and outputting a mass percentage measurement result. The sample is thoroughly dried before measurement. Before measurement, a cutting of the sample is performed, a conducting layer is sprayed on the cutting surface in a vacuum coating instrument, thereafter the sample is adhered to a sample table using a conducting double-sided adhesive, and then sent into the electron microscope for measurement.

In the context of the present specification, the method for measuring the 24-hour oil absorption rate comprises the follows: the sample particles to be tested are dried at 80° C. for 4 hours and then weighed, the weight measured is recorded as W1 (typically around 0.6 g); the dried sample is soaked in 500 ml 0 #diesel oil at 60° C. for 24 h and then taken out, the oil carried on the surface of the particles is completely blotted using oil blotting paper, then the particles are weighed and the weight measured is recorded as W2. Next, the 24-hour oil absorption rate $\Phi_{ABS}$ is calculated according to the equation $$\Phi_{ABS}=(W_2-W_1)/W_1\times 100\%.$$

In the context of the present application, unless specifically stated otherwise, all percentages, parts, ratios, etc. are expressed by weight and all pressures given are gauge pressures.

In the context of the present application, any two or more embodiments of the present application may be arbitrarily combined, and the resulting technical solution forms a part of the initial disclosure of the present application and falls within the scope of the present application.

According to an embodiment of the present application, a coated rubber particle is provided, which has a rubber core and a coating layer. The coated rubber particle has good oil resistance, and is particularly suitable for use as a plugging material for drilling fluids, particularly oil-based drilling fluids.

According to an embodiment of the present application, the core typically has a fluorine content (at %) of 0-15%, preferably 0-8%. Here, the fluorine content of the core is measured by SEM and EDS spectroscopy.

According to an embodiment of the present application, the coating layer typically has a fluorine content (at %) of 30-80%, preferably 40-65%. Here, the fluorine content of the coating layer is measured by SEM and EDS spectroscopy.

According to an embodiment of the present application, the coated rubber particle typically has a 24-hour oil absorption rate of 4% or less, preferably 3% or less, more preferably 1.5-2.5%. The inventors believe that such a low 24-hour oil absorption rate is not obtainable by existing plugging materials.

According to an embodiment of the present application, the coating layer has a high-valence metal content (at %) of 0.15-0.50%, preferably 0.20-0.30%. Here, the high-valence metal content of the coating layer is measured by SEM and EDS spectroscopy.

According to an embodiment of the present application, the core has a high-valence metal content (at %) of 0.05-0.2%, preferably 0.10-0.15%. Here, the high-valence metal content of the core is measured by SEM and EDS spectroscopy.

According to an embodiment of the present application, the high-valence metal is at least one selected from the group consisting of aluminum, calcium, titanium, magnesium, barium and silicon, preferably at least one selected from the group consisting of calcium and silicon, especially calcium.

According to an embodiment of the present application, the ratio of the content (at %) of high-valence metal in the coating layer to the content (at %) of high-valence metal in the core is typically 1 to 10, preferably 1.2 to 3.

According to an embodiment of the present application, the coating layer has a metal-to-carbon ratio (atomic ratio, referred to as metal-to-carbon ratio A) of 0.003-0.01, preferably 0.004-0.008. Here, the metal-to-carbon ratio of the coating layer is measured by SEM and EDS spectroscopy.

According to an embodiment of the present application, the core has a metal-to-carbon ratio (atomic ratio, referred to as metal-to-carbon ratio B) of 0.0008-0.003, preferably 0.001-0.002. Here, the metal-to-carbon ratio of the core is measured by SEM and EDS spectroscopy.

According to an embodiment of the present application, the ratio of the metal-to-carbon ratio A to the metal-to-carbon ratio B is between 2 and 13, preferably between 3 and 6.

According to an embodiment of the present application, the coating layer has a fluorine-to-carbon ratio (atomic ratio) of 1 to 3, preferably 1.2 to 1.8. Here, the fluorine-to-carbon ratio of the coating layer is measured by SEM and EDS spectroscopy.

According to an embodiment of the present application, the core has a fluorine-to-carbon ratio (atomic ratio) of between 0 and 0.25, preferably between 0 and 0.12. Here, the fluorine-to-carbon ratio of the core is measured by SEM and EDS spectroscopy.

According to an embodiment of the present application, the rubber is at least one selected from the group consisting of natural rubber, synthetic rubber, and a composite thereof. Here, the rubber may be fresh rubber or waste rubber, and the latter is preferable from the viewpoint of cost.

According to an embodiment of the present application, the coating layer comprises an inorganic particle. Here, the inorganic particle is preferably inorganic nanoparticle, particularly at least one selected from the group consisting of calcium carbonate nanoparticle, silica nanoparticle, alumina nanoparticle, and silica-alumina nanoparticle.

According to an embodiment of the present application, the coating layer comprises a fluoropolymer. Here, the fluoropolymer is preferably a fluorinated polyolefin, particularly at least one selected from the group consisting of tetrafluoroethylene homopolymer, tetrafluoroethylene copolymer, vinylidene fluoride homopolymer, vinylidene fluoride copolymer, hexafluoropropylene homopolymer, and hexafluoropropylene copolymer.

According to an embodiment of the present application, the weight ratio of the inorganic particle to the core is between 0.01 and 0.12, preferably between 0.02 and 0.05.

According to an embodiment of the present application, the weight ratio of the fluoropolymer to the core is between 0.015 and 0.06, preferably between 0.025 and 0.04.

According to an embodiment of the present application, the coated rubber particle typically has an average particle size of 0.5 to 20 mm, preferably 1 to 5 mm. The coated rubber particle of the present application may have any shape such as a spherical shape, a sheet shape, a block shape, or the like, or alternatively it may have any irregular shape, and there is no particular limitation. For this purpose, the average particle size of the coated rubber particle normally refers to the average of the sum of the length, width and height thereof, or the average of its maximum and minimum dimensions, or the equivalent diameter of the particle.

According to an embodiment of the present application, the inorganic particle has an average particle size of 10 to 500 nm, preferably 50 to 300 nm or 50 to 200 nm. Here, the average particle size of the inorganic particle is measured by a dynamic light scattering nanoparticle size distribution measurement method.

According to an embodiment of the present application, in the coated rubber particle, the coating layer may be continuous, that is, cover the entire surface of the core, or discontinuous, that is, cover only a part of the core, and there is no particular limitation. However, from the viewpoint of further improving the desired technical effect, the coating layer is preferably continuous or substantially continuous.

According to an embodiment of the present application, in the coated rubber particle, there is no particular limitation on the thickness of the coating layer, as long as a layer of a material is considered to be present according to common understanding of those skilled in the art. From the viewpoint of further improving the desired technical effect, the coating layer may have such a thickness that the 24-hour oil absorption rate of the coated rubber particle is reduced by 20% or more, preferably by 30% or more, more preferably by 35-60%, as compared to the case without the coating layer. By way of example, the coating layer typically has a thickness of 0.05 to 500 microns, preferably 1 to 300 microns or 20 to 200 microns. Here, the thickness refers to an average thickness of the coating layer, and its measuring method comprises: arbitrarily selecting 20 points on the SEM image, calculating the average value, and taking it as the average thickness of the coating.

According to an embodiment of the present application, the 24-hour oil absorption rate of the coated rubber particle is reduced by 20% or more, preferably by 30% or more, more preferably by 35-60%, as compared to the case without the coating layer.

According to an embodiment of the present application, a method for producing the coated rubber particle is also provided. The method can be used for producing the coated rubber particle of the present application.

According to an embodiment of the present application, the method for producing the coated rubber particle comprises the steps of:

(1) providing a rubber particle, and
(2) coating the rubber particle with at least one selected from inorganic particle and fluoropolymer to obtain the coated rubber particle.

According to an embodiment of the present application, in the method, the weight ratio of the inorganic particle to the rubber particle is typically 0.01 to 0.12, preferably 0.02 to 0.05.

According to an embodiment of the present application, in the method, the weight ratio of the fluoropolymer to the rubber particle is typically 0.015 to 0.06, preferably 0.025 to 0.04.

According to an embodiment of the present application, in the step (2), as the coating material, one or both of the inorganic particle and the fluoropolymer may be used, and preferably, both of the materials are used.

According to an embodiment of the present application, in the step (2), the coating may be performed in any manner and method conventionally known in the art as long as coating (preferably, uniform coating) of the surface of the rubber particle can be achieved. But from the viewpoint of coating uniformity, spraying or sprinkling is preferred.

According to an embodiment of the present application, in the method, the rubber particle is at least one selected from the group consisting of natural rubber particle, synthetic rubber particle, and composite particles thereof. Particularly, the rubber particle comprises waste rubber particle, i.e., particle made from waste rubber.

According to an embodiment of the present application, for the rubber particle, the 24-hour oil absorption rate before coating is typically 4-6%, while the 24-hour oil absorption rate after coating can be reduced to 4% or less, preferably 3% or less, more preferably 1.5-2.5%.

According to an embodiment of the present application, in the method, the step (2) comprises a step (2-1): performing the coating with the inorganic particle with or without drying thereafter, preferably without drying.

According to an embodiment of the present application, in the step (2-1), the coating may be performed in any manner and method conventionally known in the art as long as coating (preferably uniform coating) of the surface of the rubber particle can be achieved. But from the viewpoint of coating uniformity, spraying or sprinkling is preferred.

According to an embodiment of the present application, in the step (2-1), it is preferable to perform the coating using an ultrasonic vibration sieve, from the viewpoint of achieving the desired technical effect. Here, the ultrasonic frequency is 5-100 KHZ, preferably 10-50 KHZ or 20 to 30 KHZ, and the vibration frequency is 10-100 HZ, preferably 25-75 HZ or 45-55 HZ.

According to an embodiment of the present application, in the step (2-1), the operation temperature is 40-85° C., preferably 45-70° C. or 55-60° C.

According to an embodiment of the present application, as preferable operation conditions for the spraying or sprinkling, the spray gun air pressure is controlled to be 0.1-0.5 MPaG, preferably 0.2-0.3 MPaG, and the nozzle diameter is 2-20 mm, preferably 5-10 mm.

According to an embodiment of the present application, in the method, the step (2) comprises a step (2-2): performing the coating with the fluoropolymer with or without drying thereafter, preferably without drying.

According to an embodiment of the present application, in the step (2-2), the coating may be performed in any manner and method conventionally known in the art as long as coating (preferably uniform coating) of the surface of the rubber particle can be achieved. But from the viewpoint of coating uniformity, spraying or sprinkling is preferred.

According to an embodiment of the present application, in the step (2-2), it is preferable to perform the coating using a vibration sieve or an ultrasonic vibration sieve, from the viewpoint of achieving the desired technical effect. Here, the vibration frequency is typically 10-100 HZ, preferably 25-75 HZ or 45 to 55 Hz, without ultrasonic or with an ultrasonic frequency typically of 5-100 KHZ, preferably 10-50 KHZ or 20-30 KHZ.

According to an embodiment of the present application, in the step (2-2), the operation temperature is 20 to 45° C., preferably 30 to 35° C.

According to an embodiment of the present application, in the step (2-2), as preferable operation conditions for the spraying or sprinkling, the spray gun air pressure is controlled to be 0.1-0.5 MPaG, preferably 0.2-0.3 MPaG, and the nozzle diameter is 2-20 mm, preferably 5-10 mm.

According to an embodiment of the present application, the step (2-2) may be performed before the step (2-1), simultaneously with the step (2-1), or after the step (2-1), and is preferably performed after the step (2-1).

According to an embodiment of the present application, in the method, the fluoropolymer is a fluorinated polyolefin, and particularly at least one selected from the group consisting of tetrafluoroethylene homopolymer, tetrafluoroethylene copolymer, vinylidene fluoride homopolymer, vinylidene fluoride copolymer, hexafluoropropylene homopolymer, and hexafluoropropylene copolymer.

According to an embodiment of the present application, in the method, the inorganic particle is an inorganic nanoparticle, particularly at least one selected from the group consisting of calcium carbonate nanoparticle, silica nanoparticle, alumina nanoparticle, and silica-alumina nanoparticle.

According to an embodiment of the present application, in the method, the rubber particle typically has an average particle size of 0.5 to 20 mm, preferably 1 to 5 mm. Here, the rubber particle may have any shape such as a sphere shape, a sheet shape, a block shape, or the like, or alternatively the rubber particle may have any irregular shape, and there is no particular limitation. For this purpose, the average particle size of the rubber particle normally means the average of the sum of the length, width and height thereof, the average of its maximum and minimum dimensions, or the equivalent diameter of the particle.

According to an embodiment of the present application, in the method, the inorganic particle has an average particle size of 10 to 500 nm, preferably 50 to 300 nm or 50 to 200 nm. Here, the average particle size of the inorganic particle is measured by a dynamic light scattering nanoparticle size distribution measurement method.

According to an embodiment of the present application, in the method, the inorganic particle is used in the form of a coating composition comprising the inorganic particle (referred to as an inorganic coating composition). To this end, the inorganic coating composition typically comprises the inorganic particle, a binder, optionally a coupling agent, optionally a wetting agent, optionally a dispersant, and optionally a vehicle.

According to an embodiment of the present application, there is no particular limitation to the binder, and those conventionally known in the art may be used. Specific examples of the binder may include polymer emulsions, particularly at least one selected from the group consisting of polyacrylate-based emulsion, polyvinyl acetate-based emulsion, ethyl α-cyanoacrylate emulsion, epoxy resin emulsion, polyurethane emulsion, and rosin emulsion, and more particularly polyvinyl acetate-based emulsion.

According to an embodiment of the present application, there is no particular limitation to the coupling agent, and those conventionally known in the art may be used. Specific examples of the coupling agent may include silane coupling agents, preferably at least one selected from vinyl tri-(C1-6 alkoxy) (preferably tri-(C1-4 alkoxy)) silanes, and particularly at least one selected from the group consisting of vinyltriethoxysilane, vinyltrimethoxysilane and vinyl tri-(β-methoxyethoxy)silane.

According to an embodiment of the present application, there is no particular limitation to the wetting agent, and those conventionally known in the art may be used. Specific examples of the wetting agent may include at least one selected from the group consisting of polyethylene glycol, alkyl sulfate, organic sulfonate and polyoxyethylene ether, and more preferably at least one selected from the group consisting of polyethylene glycol and alkyl sulfate.

According to an embodiment of the present application, there is no particular limitation to the dispersant, and those conventionally known in the art may be used. Specific examples of the dispersant may include at least one selected from the group consisting of polyacrylate salts, cellulose derivatives, polyacrylamides, and polyoxyethylene ether phosphates, and sodium cellulose sulfate is more preferable.

According to an embodiment of the present application, there is no particular limitation to the vehicle, and those conventionally known in the art may be used. As the vehicle, water may be specifically mentioned, for example.

According to an embodiment of the present application, in the method, the inorganic coating composition comprises, in parts by weight, 10 to 50 parts by weight (preferably 15 to 25 parts by weight) of the inorganic particle, 10 to 30 parts by weight (preferably 20 to 30 parts by weight) of the binder, 0 to 10 parts by weight (preferably 2 to 5 parts by weight) of the optional coupling agent, 0 to 10 parts by weight (preferably 2 to 5 parts by weight) of the optional wetting agent, 0 to 10 parts by weight (preferably 2 to 5 parts by weight) of the optional dispersant, and 0 to 10 parts by weight (preferably 2 to 5 parts by weight) of the optional vehicle.

According to an embodiment of the present application, in the method, the fluoropolymer is used in the form of a coating composition comprising the fluoropolymer (referred to as a fluorine-containing coating composition).

According to an embodiment of the present application, in the method, the fluorine-containing coating composition comprises at least the fluoropolymer, a dispersant and a vehicle. Here, as the vehicle, water may be specifically mentioned, for example.

According to an embodiment of the present application, in the fluorine-containing coating composition, the dispersant is not particularly limited, and those conventionally known in the art may be used. Specific examples of the dispersant may include surfactants, particularly at least one selected from the group consisting of potassium perfluorooctyl sulfonate and ammonium perfluorooctanoate, and more preferably potassium perfluorooctyl sulfonate.

According to an embodiment of the present application, in the method, the fluorine-containing coating composition comprises, in parts by weight, 3 to 15 parts by weight (preferably 5 to 10 parts by weight) of the fluoropolymer, 1 to 8 parts by weight (preferably 1 to 3 parts by weight) of the dispersant, and 20 to 50 parts by weight (preferably 25 to 40 parts by weight) of the vehicle.

According to an embodiment of the present application, in the method, a wetting step is further included between the step (1) and the step (2). In the wetting step, the rubber particle is treated with a wetting agent and then dried or not dried, preferably not dried.

According to an embodiment of the present application, in the method, the weight ratio of the wetting agent to the rubber particle is 0.01 to 0.05, preferably 0.02 to 0.035.

According to an embodiment of the present application, in the wetting step, the treatment may be performed in any manner and method conventionally known in the art as long as coating (preferably uniform coating) of the surface of the rubber particle can be achieved, but from the viewpoint of coating uniformity, spraying or sprinkling is preferred.

According to an embodiment of the present application, in the wetting step, as the wetting agent, for example, at least one selected from the group consisting of carboxylic acids and alcohols, more preferably at least one selected from the group consisting of easily water-soluble carboxylic acids and easily water-soluble alcohols, particularly at least one selected from the group consisting of C1-6 monocarboxylic or polycarboxylic acids and C1-6 monohydric or polyhydric alcohols, and more particularly at least one selected from the group consisting of acetic acid and glycerin, may be mentioned.

According to an embodiment of the present application, in the wetting step, the wetting agent is used in the form of a composition comprising the wetting agent (referred to as wetting agent composition). Here, the wetting agent composition typically comprises the wetting agent and water.

According to an embodiment of the present application, the wetting agent composition comprises, in parts by weight, 2 to 15 parts by weight (preferably 3 to 10 parts by weight) of the wetting agent and 98 to 85 parts by weight (preferably 90 to 97 parts by weight) of water.

According to a preferred embodiment of the present application, the method for producing the coated rubber particle comprises: (1) cleaning and drying the rubber particle; (2) spraying the rubber particle with an acetic acid solution having a mass concentration of 8% and then with a glycerol solution having a mass concentration of 5%, and continuously turning over the rubber particle during the spraying process to ensure that all surfaces of the rubber particle are fully wetted; (3) placing the wetted rubber particle on a temperature-controlled ultrasonic vibration sieve, wherein the mesh size of the sieve cloth is smaller than the diameter of the rubber particle so as to prevent the rubber particle from being sieved; (4) adding an inorganic nanoparticle in an amount of 20-30% by mass into a polyvinyl acetate emulsion comprising 2-5% of a silane coupling agent, and mixing thoroughly under stirring to obtain an inorganic nanoparticle dispersion liquid; (5) starting the ultrasonic vibration sieve, controlling the temperature to be between 55 and 60° C., controlling the ultrasonic frequency to be between 20 and 30 KHZ and the vibration frequency to be 50 HZ, uniformly spraying the inorganic nanoparticle dispersion liquid onto the rubber particle by using a spray gun, controlling the air pressure of the spray gun to be between 0.2 and 0.3 MPa and controlling the diameter of the nozzle to be between 5 and 10 mm; (6) after spraying uniformly, continuing to spray with a polytetrafluoroethylene emulsion having a mass concentration of 10-20%, keeping vibration and turning off the ultrasonic during the spraying process, and adjusting the temperature to 30-35° C. after spraying is finished; and (7) naturally cooling to room temperature to obtain the coated rubber particle.

According to an embodiment of the present application, a drilling fluid composition comprising a plugging material and a base slurry is also provided. Here, the plugging material comprises or is the coated rubber particle described in any one of the embodiments described hereinabove or hereinbelow, or the plugging material comprises or is the coated rubber particle produced by the method described in any one of the embodiments described hereinabove or hereinbelow. In addition, as the drilling fluid composition, an oil-based drilling fluid composition is preferred.

According to an embodiment of the present application, as the drilling fluid base slurry, any base slurry conventionally used in the art in drilling fluid compositions can be used without particular limitation, but an oil-based drilling fluid base slurry is preferred, and particularly, at least one selected from the group consisting of white oil-based drilling fluid base slurry, diesel oil-based drilling fluid base slurry, and synthetic based drilling fluid base slurry may be mentioned.

According to an embodiment of the present application, the coated rubber particle is present in an amount of 2-12 wt %, preferably 3-8 wt %, based on the total amount of the drilling fluid composition taken as 100 wt %.

According to an embodiment of the present application, the drilling fluid composition may further comprise other components conventionally used in the art in drilling fluid compositions, and there is no particular limitation.

EXAMPLES

The present application will be described in further detail below by way of examples and comparative examples, but the present application is not limited to the following examples.

In the following examples and comparative examples, the fibrous material is bamboo fiber (having a diameter of 0.1 to 0.2 mm, a length of 3 to 10 mm), the rubber particle A is natural rubber particle (having an average particle size of 1 to 3 mm), the rubber particle B is styrene butadiene rubber particle (having an average particle size of 3 to 5 mm), and the oil-based drilling fluid is consisted of diesel oil+25% saline water+3% emulsifier+2% wetting agent+1% calcium oxide+2% oxidized asphalt.

Example 1

Natural rubber particle A of 1-3 mm was taken, cleaned and dried; sprayed and wetted with an acetic acid solution having a mass concentration of 5%; coated with an inorganic coating composition comprising 15 parts by weight of calcium carbonate nanoparticle with a D90 of 75 nm, 20 parts by weight of a polyacrylate-based emulsion, 2 parts by weight of vinyl triethoxysilane, 2 parts by weight of polyethylene glycol, 2 parts by weight of polyacrylate and 2 parts by weight of water, under operation conditions including the use of an ultrasonic vibration sieve, an operation temperature of 40° C., an ultrasonic frequency of 10 KHZ, a vibration frequency of 20 HZ, an air pressure of the spray gun controlled to be 0.1 MPaG, and a nozzle diameter of 20 mm; then coated with a fluorine-containing coating composition comprising 3 parts by weight of tetrafluoroethylene homopolymer, 1 part by weight of potassium perfluorooctyl sulfonate and 20 parts by weight of water, under operation conditions including the use of a vibration sieve, an operation temperature of 30° C., a vibration frequency of 40 HZ, an air pressure of the spray gun controlled to be 0.1 MPaG, a nozzle diameter of 20 mm, and an ultrasonic frequency of 20 KHZ.

An analysis of the coated rubber particle obtained showed an average particle size of 2.33 mm, a thickness of the coating layer of 236.3 microns, a fluorine content (at %) of the core of 0%, a fluorine content (at %) of the coating layer of 53.5%, and 24-hour oil absorption rate of the coated rubber particle of 3.2%. The ratio of the content (at %) of high-valence metal in the coating layer to the content (at %) of high-valence metal in the core was 3.6, the content (at %) of high-valence metal in the coating layer was 0.18%, the content (at %) of high-valence metal in the core was 0.05%, the metal-to-carbon ratio A (atomic ratio) of the coating layer was 0.004, the metal-to-carbon ratio B (atomic ratio) of the core was 0.001, the ratio of the metal-to-carbon ratio A to the metal-to-carbon ratio B was 4, the fluorine-to-carbon ratio (atomic ratio) of the coating layer was 1.20, and the fluorine-to-carbon ratio (atomic ratio) of the core was 0.

Example 2

Synthetic rubber particle B of 1-3 mm was taken, cleaned and dried; sprayed and wetted with an ethylene glycol solution having a mass concentration of 6%; coated with an inorganic coating composition comprising 18 parts by weight of calcium carbonate nanoparticle with a D90 of 75 nm, 25 parts by weight of a polyvinyl acetate-based emulsion, 4 parts by weight of vinyl trimethoxy silane, 3 parts by weight of alkyl sulfate, 4 parts by weight of cellulose derivative and 5 parts by weight of water, under operation conditions including the use of an ultrasonic vibration sieve, an operation temperature of 50° C., an ultrasonic frequency of 30 KHZ, a vibration frequency of 30 HZ, an air pressure of the spray gun controlled to be 0.5 MPaG, and a nozzle diameter of 5 mm; then coated with a fluorine-containing coating composition comprising 6 parts by weight of tetrafluoroethylene copolymer, 2 parts by weight of potassium perfluorooctyl sulfonate and 30 parts by weight of water, under operation conditions including the use of a vibration sieve, an operation temperature of 40° C., a vibration frequency of 50 HZ, an air pressure of the spray gun controlled to be 0.5 MPaG, a nozzle diameter of 5 mm, and no ultrasonic.

An analysis of the coated rubber particle obtained showed an average particle size of 2.56 mm, a thickness of the coating layer of 349.7 microns, a fluorine content (at %) of the core of 1.5%, a fluorine content (at %) of the coating layer of 60.7%, and 24-hour oil absorption rate of the coated rubber particle of 2.8%. The ratio of the content (at %) of high-valence metal in the coating layer to the content (at %) of high-valence metal in the core was 3, the content (at %) of high-valence metal in the coating layer was 0.24%, the content (at %) of high-valence metal in the core was 0.08%, the metal-to-carbon ratio A (atomic ratio) of the coating layer was 0.0063, the metal-to-carbon ratio B (atomic ratio) of the core was 0.0016, the ratio of the metal-to-carbon ratio A to the metal-to-carbon ratio B was 3.94, the fluorine-tocarbon ratio (atomic ratio) of the coating layer was 1.60, and the fluorine-to-carbon ratio (atomic ratio) of the core was 0.03.

Example 3

Synthetic rubber particle B of 1-3 mm was taken, cleaned and dried; sprayed and wetted with an ethanol solution having a mass concentration of 10%; coated with an inorganic coating composition comprising 15 parts by weight of silica nanoparticle with a D90 of 136 nm, 20 parts by weight of a polyacrylate-based emulsion, 2 parts by weight of vinyl trimethoxy silane, 3 parts by weight of polyoxyethylene ether, 1 part by weight of polyacrylamide and 4 parts by weight of water, under operation conditions including the use of an ultrasonic vibration sieve, an operation temperature of 60° C., an ultrasonic frequency of 50 KHZ, a vibration frequency of 75 HZ, an air pressure of the spray gun controlled to be 0.2 MPaG, and a nozzle diameter of 10 mm; then coated with a fluorine-containing coating composition comprising 12 parts by weight of tetrafluoroethylene copolymer, 2 parts by weight of ammonium perfluorooctanoate and 30 parts by weight of water, under operation conditions including the use of a vibration sieve, an operation temperature of 40° C., a vibration frequency of 50 HZ, an air pressure of the spray gun controlled to be 0.2 MPaG, a nozzle diameter of 10 mm, and an ultrasonic frequency of 200 KHZ.

An analysis of the coated rubber particle obtained showed an average particle size of 2.38 mm, a thickness of the coating layer of 193.7 microns, a fluorine content (at %) of the core of 4.2%, a fluorine content (at %) of the coating layer of 68.1%, and 24-hour oil absorption rate of the coated rubber particle of 1.8%. The ratio of the content (at %) of high-valence metal in the coating layer to the content (at %) of high-valence metal in the core was 3.6, the content (at %) of high-valence metal in the coating layer was 0.26%, the content (at %) of high-valence metal in the core was 0.08%, the metal-to-carbon ratio A (atomic ratio) of the coating layer was 0.0092, the metal-to-carbon ratio B (atomic ratio) of the core was 0.0029, the ratio of the metal-to-carbon ratio A to the metal-to-carbon ratio B was 3.17, the fluorine-to-carbon ratio (atomic ratio) of the coating layer was 2.4, and the fluorine-to-carbon ratio (atomic ratio) of the core was 0.15.

Example 4

Synthetic rubber particle B of 3-5 mm was taken, cleaned and dried; sprayed and wetted with a glycerol solution having a mass concentration of 10%; coated with an inorganic coating composition comprising 25 parts by weight of silica nanoparticle with a D90 of 136 nm, 25 parts by weight of epoxy resin emulsion, 10 parts by weight of vinyl tri-(β-methyl ethoxy) silane, 2 parts by weight of organic sulfonate, 2 parts by weight of polyoxyethylene ether phosphate and 5 parts by weight of water, under operation conditions including the use of an ultrasonic vibration sieve, an operation temperature of 60° C., an ultrasonic frequency of 50 KHZ, a vibration frequency of 60 HZ, an air pressure of the spray gun controlled to be 0.3 MPaG, and a nozzle diameter of 8 mm; then coated with a fluorine-containing coating composition comprising 10 parts by weight of hexafluoropropylene homopolymer, 5 parts by weight of ammonium perfluorooctanoate and 30 parts by weight of water, under operation conditions including the use of a vibration sieve, an operation temperature of 35° C., a vibration frequency of 55 HZ, an air pressure of the spray gun controlled to be 0.3 MPaG, a nozzle diameter of 8 mm, and an ultrasonic frequency of 50 KHZ.

An analysis of the coated rubber particle obtained showed an average particle size of 4.67 mm, a thickness of the coating layer of 138.3 microns, a fluorine content (at %) of the core of 11.5%, a fluorine content (at %) of the coating layer of 67.5%, and 24-hour oil absorption rate of the coated rubber particle of 2.3%. The ratio of the content (at %) of high-valence metal in the coating layer to the content (at %) of high-valence metal in the core was 2.31, the content (at %) of high-valence metal in the coating layer was 0.30%, the content (at %) of high-valence metal in the core was 0.12%, the metal-to-carbon ratio A (atomic ratio) of the coating layer was 0.0098, the metal-to-carbon ratio B (atomic ratio) of the core was 0.0025, the ratio of the metal-to-carbon ratio A to the metal-to-carbon ratio B was 3.92, the fluorine-to-carbon ratio (atomic ratio) of the coating layer was 2.2, and the fluorine-to-carbon ratio (atomic ratio) of the core was 0.24.

Example 5

Synthetic rubber particle B of 3-5 mm was taken, cleaned and dried; sprayed and wetted with an oxalic acid solution having a mass concentration of 12%; coated with an inorganic coating composition comprising 15 parts by weight of alumina nanoparticle with a D90 of 185 nm, 15 parts by weight of polyurethane emulsion, 4 parts by weight of vinyl trimethoxy silane, 6 parts by weight of polyoxyethylene ether, 6 parts by weight of a cellulose derivative and 6 parts by weight of water, under operation conditions including the use of an ultrasonic vibration sieve, an operation temperature of 85° C., an ultrasonic frequency of 100 KHZ, a vibration frequency of 80 HZ, an air pressure of the spray gun controlled to be 0.4 MPaG, and a nozzle diameter of 4 mm; then coated with a fluorine-containing coating composition comprising 10 parts by weight of vinylidene fluoride homopolymer, 4 parts by weight of potassium perfluorooctyl sulfonate and 40 parts by weight of water, under operation conditions including the use of a vibration sieve, an operation temperature of 45° C., a vibration frequency of 40 HZ, an air pressure of the spray gun controlled to be 0.4 MPaG, a nozzle diameter of 4 mm, and an ultrasonic frequency of 100 KHZ.

An analysis of the coated rubber particle obtained showed an average particle size of 3.96 mm, a thickness of the coating layer of 63.7 microns, a fluorine content (at %) of the core of 5.94%, a fluorine content (at %) of the coating layer of 60.23%, and 24-hour oil absorption rate of the coated rubber particle of 2.7%. The ratio of the content (at %) of high-valence metal in the coating layer to the content (at %) of high-valence metal in the core was 2.09, the content (at %) of high-valence metal in the coating layer was 0.23%, the content (at %) of high-valence metal in the core was 0.11%, the metal-to-carbon ratio A (atomic ratio) of the coating layer was 0.0063, the metal-to-carbon ratio B (atomic ratio) of the core was 0.0015, the ratio of the metal-to-carbon ratio A to the metal-to-carbon ratio B was 4.2, the fluorine-to-carbon ratio (atomic ratio) of the coating layer was 1.66, and the fluorine-to-carbon ratio (atomic ratio) of the core was 0.08.

Figure 2:
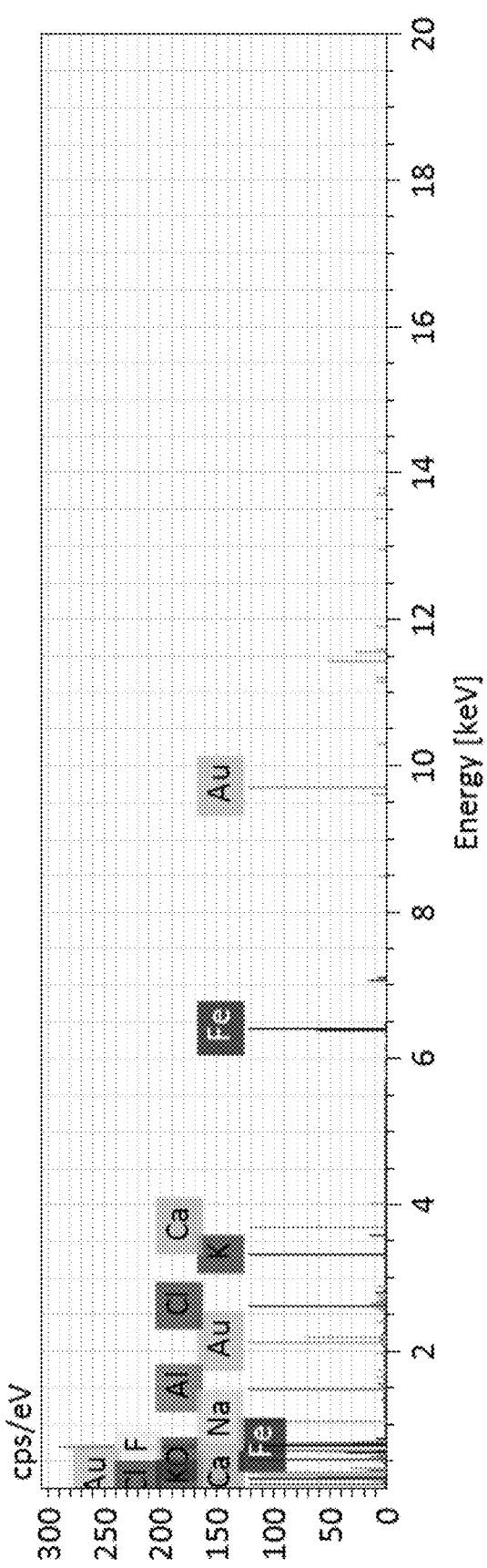
FIG. 2 shows the EDS spectrum of the coated rubber particle obtained in Example 5.

An SEM image of the coated rubber particle obtained in Example 5 is shown in FIG. 1, in which the coating layer and the rubber core can be clearly distinguished. Two positions 1 and 2 on the coating layer were selected and one position 3 on the rubber core was selected, and the EDS spectra data for these three positions are given in FIG. 2.

Example 6

Natural rubber A and synthetic rubber B composite particle of 1-3 mm was taken, cleaned and dried; sprayed and wetted with a glycerol solution having a mass concentration of 6%; coated with an inorganic coating composition comprising 30 parts by weight of calcium carbonate nanoparticle with a D90 of 36 nm, 30 parts by weight of ethyl α-cyanoacrylate emulsion, 8 parts by weight of vinyl triethoxysilane, 8 parts by weight of alkyl sulfate, 6 parts by weight of polyacrylamide and 10 parts by weight of water, under operation conditions including the use of an ultrasonic vibration sieve, an operation temperature of 60° C., an ultrasonic frequency of 50 KHZ, a vibration frequency of 35 HZ, an air pressure of the spray gun controlled to be 0.4 MPaG, and a nozzle diameter of 4 mm; then coated with a fluorine-containing coating composition comprising 8 parts by weight of a tetrafluoroethylene homopolymer, 4 parts by weight of potassium perfluorooctylsulfonate and 25 parts by weight of water, under operation conditions including the use of a vibration sieve, an operation temperature of 35° C., a vibration frequency of 45 HZ, an air pressure of the spray gun controlled to be 0.4 MPaG, a nozzle diameter of 4 mm, and an ultrasonic frequency of 50 KHZ.

An analysis of the coated rubber particle obtained showed an average particle size of 2.46 mm, a thickness of the coating layer of 273.8 microns, a fluorine content (at %) of the core of 3.7%, a fluorine content (at %) of the coating layer of 63.2%, and 24-hour oil absorption rate of the coated rubber particle of 2.5%. The ratio of the content (at %) of high-valence metal in the coating layer to the content (at %) of high-valence metal in the core was 3.09, the content (at %) of high-valence metal in the coating layer was 0.34%, the content (at %) of high-valence metal in the core was 0.11%, the metal-to-carbon ratio A (atomic ratio) of the coating layer was 0.0099, the metal-to-carbon ratio B (atomic ratio) of the core was 0.0027, the ratio of the metal-to-carbon ratio A to the metal-to-carbon ratio B was 3.67, the fluorine-to-carbon ratio (atomic ratio) of the coating layer was 1.84, and the fluorine-to-carbon ratio (atomic ratio) of the core was 0.09.

Example 7

Natural rubber A and synthetic rubber B composite particle of 3-5 mm was taken, cleaned and dried; sprayed and wetted with an oxalic acid solution having a mass concentration of 6%; coated with an inorganic coating composition comprising 20 parts by weight of calcium carbonate nanoparticle with a D90 of 36 nm, 20 parts by weight of a polyvinyl acetate-based emulsion, 5 parts by weight of vinyl trimethoxy silane, 5 parts by weight of alkyl sulfate, 5 parts by weight of polyacrylate and 5 parts by weight of water, under operation conditions including the use of an ultrasonic vibration sieve, an operation temperature of 50° C., an ultrasonic frequency of 50 KHZ, a vibration frequency of 35 HZ, an air pressure of the spray gun controlled to be 0.3 MPaG, and a nozzle diameter of 8 mm; then coated with a fluorine-containing coating composition comprising 8 parts by weight of tetrafluoroethylene homopolymer, 3 parts by weight of potassium perfluorooctyl sulfonate and 30 parts by weight of water, under operation conditions including the use of a vibration sieve, an operation temperature of 35° C., a vibration frequency of 45 HZ, an air pressure of the spray gun controlled to be 0.3 MPaG, a nozzle diameter of 8 mm, and an ultrasonic frequency of 50 KHZ.

An analysis of the coated rubber particle obtained showed a fluorine content (at %) of the core of 3.9%, a fluorine content (at %) of the coating layer of 68.1%, and 24-hour oil absorption rate of the coated rubber particle of 1.8%. The ratio of the content (at %) of high-valence metal in the coating layer to the content (at %) of high-valence metal in the core was 2.9, the content (at %) of high-valence metal in the coating layer was 0.29%, the content (at %) of high-valence metal in the core was 0.10%, the metal-to-carbon ratio A (atomic ratio) of the coating layer was 0.0099, the metal-to-carbon ratio B (atomic ratio) of the core was 0.0021, the ratio of the metal-to-carbon ratio A to the metal-to-carbon ratio B was 4.71, the fluorine-to-carbon ratio (atomic ratio) of the coating layer was 2.33, and the fluorine-to-carbon ratio (atomic ratio) of the core was 0.08.

Example 8

Synthetic rubber particle B of 1-3 mm was taken, cleaned and dried; sprayed and wetted with an ethylene glycol solution having a mass concentration of 10%; coated with an inorganic coating composition comprising 18 parts by weight of silica-alumina nanoparticle with a D90 of 167 nm, 15 parts by weight of a polyacrylate-based emulsion, 4 parts by weight of vinyl tri-(β-methoxyethoxy) silane, 4 parts by weight of polyethylene glycol, 3 parts by weight of polyacrylate and 5 parts by weight of water, under operation conditions including the use of an ultrasonic vibration sieve, an operation temperature of 60° C., an ultrasonic frequency of 20 KHZ, a vibration frequency of 30 HZ, an air pressure of the spray gun controlled to be 0.2 MPaG, and a nozzle diameter of 10 mm; then coated with a fluorine-containing coating composition comprising 5 parts by weight of a hexafluoroethylene homopolymer, 2 parts by weight of potassium perfluorooctylsulfonate and 25 parts by weight of water, under operation conditions including the use of a vibration sieve, an operation temperature of 30° C., a vibration frequency of 30 Hz, an air pressure of the spray gun controlled to be 0.2 MPaG, a nozzle diameter of 10 mm, and an ultrasonic frequency of 20 KHZ.

An analysis of the coated rubber particle obtained showed an average particle size of 2.17 mm, a thickness of the coating layer of 269.2 microns, a fluorine content (at %) of the core of 5.3%, a fluorine content (at %) of the coating layer of 54.9%, and 24-hour oil absorption rate of the coated rubber particle of 2.6%. The ratio of the content (at %) of high-valence metal in the coating layer to the content (at %) of high-valence metal in the core was 2.25, the content (at %) of high-valence metal in the coating layer was 0.27%, the content (at %) of high-valence metal in the core was 0.12%, the metal-to-carbon ratio A (atomic ratio) of the coating layer was 0.0064, the metal-to-carbon ratio B (atomic ratio) of the core was 0.003, the ratio of the metal-to-carbon ratio A to the metal-to-carbon ratio B was 2.13, the fluorine-to-carbon ratio (atomic ratio) of the coating layer was 1.3, and the fluorine-to-carbon ratio (atomic ratio) of the core was 0.13.

Example 9

Synthetic rubber particle B of 1-3 mm was taken, cleaned and dried; sprayed and wetted with a glycerol solution having a mass concentration of 8%; coated with an inorganic coating composition comprising 25 parts by weight of calcium carbonate nanoparticle with a D90 of 75 nm, 20 parts by weight of a polyvinyl acetate-based emulsion, 5 parts by weight of rosin emulsion, 5 parts by weight of vinyl triethoxysilane, 5 parts by weight of polyethylene glycol, 3 parts by weight of polyacrylate and 8 parts by weight of water, under operation conditions including the use of an ultrasonic vibration sieve, an operation temperature of 70° C., an ultrasonic frequency of 20 KHZ, a vibration frequency of 45 HZ, an air pressure of the spray gun controlled to be 0.3 MPaG, and a nozzle diameter of 8 mm; then coated with a fluorine-containing coating composition comprising 10 parts by weight of a tetrafluoroethylene homopolymer, 3 parts by weight of potassium perfluorooctyl sulfonate and 30 parts by weight of water, under operation conditions including the use of a vibration sieve, an operation temperature of 30° C., a vibration frequency of 45 HZ, an air pressure of the spray gun controlled to be 0.3 MPaG, a nozzle diameter of 8 mm, and an ultrasonic frequency of 20 KHZ.

An analysis of the coated rubber particle obtained showed an average particle size of 2.83 mm, a thickness of the coating layer of 177.6 microns, a fluorine content (at %) of the core of 6.3%, a fluorine content (at %) of the coating layer of 57.8%, and 24-hour oil absorption rate of the coated rubber particle of 1.7%. The ratio of the content (at %) of high-valence metal in the coating layer to the content (at %) of high-valence metal in the core was 6.17, the content (at %) of high-valence metal in the coating layer was 0.37%, the content (at %) of high-valence metal in the core was 0.06%, the metal-to-carbon ratio A (atomic ratio) of the coating layer was 0.0096, the metal-to-carbon ratio B (atomic ratio) of the core was 0.0021, the ratio of the metal-to-carbon ratio A to the metal-to-carbon ratio B was 4.57, the fluorine-to-carbon ratio (atomic ratio) of the coating layer was 1.5, and the fluorine-to-carbon ratio (atomic ratio) of the core was 0.22.

Example 10

Synthetic rubber particle B of 1-3 mm was taken, cleaned and dried; sprayed and wetted with a mixture of an acetic acid solution having a mass concentration of 5% and a glycerol solution having a mass concentration of 5%; coated with an inorganic coating composition comprising 22 parts by weight of silica nanoparticle with a D90 of 136 nm, 25 parts by weight of a polyacrylate-based emulsion, 3 parts by weight of vinyl triethoxysilane, 3 parts by weight of alkyl sulfate, 4 parts by weight of sodium cellulose sulfate and 5 parts by weight of water, under operation conditions including the use of an ultrasonic vibration sieve, an operation temperature of 45° C., an ultrasonic frequency of 10 KHZ, a vibration frequency of 20 HZ, an air pressure of the spray gun controlled to be 0.2 MPaG, and a nozzle diameter of 10 mm; then coated with a fluorine-containing coating composition comprising 6 parts by weight of tetrafluoroethylene copolymer, 3 parts by weight of ammonium perfluorooctanoate and 35 parts by weight of water, under operation conditions including the use of a vibration sieve, an operation temperature of 30° C., a vibration frequency of 40 HZ, an air pressure of the spray gun controlled to be 0.2 MPaG, a nozzle diameter of 10 mm, and an ultrasonic frequency of 20 KHZ.

An analysis of the coated rubber particle obtained showed an average particle size of 2.58 mm, a thickness of the coating layer of 257.4 microns, a fluorine content (at %) of the core of 5.9%, a fluorine content (at %) of the coating layer of 61.1%, and 24-hour oil absorption rate of the coated rubber particle of 2.3%. The ratio of the content (at %) of high-valence metal in the coating layer to the content (at %) of high-valence metal in the core was 2, the content (at %) of high-valence metal in the coating layer was 0.26%, the content (at %) of high-valence metal in the core was 0.13%, the metal-to-carbon ratio A (atomic ratio) of the coating layer was 0.0072, the metal-to-carbon ratio B (atomic ratio) of the core was 0.0026, the ratio of the metal-to-carbon ratio A to the metal-to-carbon ratio B was 2.77, the fluorine-to-carbon ratio (atomic ratio) of the coating layer was 1.7, and the fluorine-to-carbon ratio (atomic ratio) of the core was 0.12.

Example 11

Natural rubber particle A of 1-3 mm was taken, cleaned and dried; sprayed and wetted with an acetic acid solution having a mass concentration of 5%; coated with an inorganic coating composition comprising 15 parts by weight of calcium carbonate nanoparticle with a D90 of 75 nm, 20 parts by weight of a polyacrylate-based emulsion, 2 parts by weight of vinyl triethoxysilane, 2 parts by weight of polyethylene glycol, 2 parts by weight of polyacrylate and 2 parts by weight of water, under operation conditions including the use of an ultrasonic vibration sieve, an operation temperature of 40° C., an ultrasonic frequency of 10 KHZ, a vibration frequency of 20 HZ, an air pressure of the spray gun controlled to be 0.1 MPaG, and a nozzle diameter of 20 mm.

An analysis of the coated rubber particle obtained showed an average particle size of 2.77 mm, a thickness of the coating layer of 74.6 microns, and 24-hour oil absorption rate of the coated rubber particle of 5.7%. The ratio of the content (at %) of high-valence metal in the coating layer to the content (at %) of high-valence metal in the core was 3.5, the content (at %) of high-valence metal in the coating layer was 0.14%, the content (at %) of high-valence metal in the core was 0.04%, the metal-to-carbon ratio A (atomic ratio) of the coating layer was 0.0042, the metal-to-carbon ratio B (atomic ratio) of the core was 0.0013, and the ratio of the metal-to-carbon ratio A to the metal-to-carbon ratio B was 3.23.

Example 12

Natural rubber particle A of 1-3 mm was taken, cleaned and dried; sprayed and wetted with an acetic acid solution having a mass concentration of 5%; then coated with a fluorine-containing coating composition comprising 3 parts by weight of tetrafluoroethylene homopolymer, 1 part by weight of potassium perfluorooctyl sulfonate and 20 parts by weight of water, under operation conditions including the use of a vibration sieve, an operation temperature of 30° C., a vibration frequency of 40 HZ, an air pressure of the spray gun controlled to be 0.1 MPaG, a nozzle diameter of 20 mm, and an ultrasonic frequency of 20 KHZ.

An analysis of the coated rubber particle obtained showed an average particle size of 2.62 mm, a thickness of the coating layer of 217.5 microns, a fluorine content (at %) of the core of 0%, a fluorine content (at %) of the coating layer of 63.3%, and 24-hour oil absorption rate of the coated rubber particle of 3.9%. The ratio of the content (at %) of high-valence metal in the coating layer to the content (at %) of high-valence metal in the core was 2.2, the content (at %) of high-valence metal in the coating layer was 0.11%, the content (at %) of high-valence metal in the core was 0.05%, the metal-to-carbon ratio A (atomic ratio) of the coating layer was 0.0031, the metal-to-carbon ratio B (atomic ratio) of the core was 0.0008, the ratio of the metal-to-carbon ratio A to the metal-to-carbon ratio B was 3.88, the fluorine-to-carbon ratio (atomic ratio) of the coating layer was 1.81, and the fluorine-to-carbon ratio (atomic ratio) of the core was 0.

Application Example 1

The coated rubber particle obtained in Example 1 was added in an amount of 5% by mass into the oil-based drilling fluid to obtain an oil-based plugging drilling fluid.

Application Example 2

The coated rubber particle obtained in Example 9 was added in an amount of 5% by mass into the oil-based drilling fluid to obtain an oil-based plugging drilling fluid.

Application Example 3

The coated rubber particle obtained in Example 6 was added in an amount of 5% by mass into the oil-based drilling fluid to obtain an oil-based plugging drilling fluid.

Application Example 4

The coated rubber particle obtained in Example 2 was added in an amount of 3% by mass and the coated rubber particle obtained in Example 3 was added in an amount of 2% by mass into the oil-based drilling fluid to obtain an oil-based plugging drilling fluid.

Application Example 5

The coated rubber particle obtained in Example 3 was added in an amount of 3% by mass and the coated rubber particle obtained in Example 4 was added in an amount of 2% by mass into the oil-based drilling fluid to obtain an oil-based plugging drilling fluid.

Application Example 6

The coated rubber particle obtained in Example 4 was added in an amount of 3% by mass and the coated rubber particle obtained in Example 5 was added in an amount of 2% by mass into the oil-based drilling fluid to obtain an oil-based plugging drilling fluid.

Application Example 7

The coated rubber particle obtained in Example 5 was added in an amount of 3% by mass and the fibrous material was added in an amount of 2% by mass into the oil-based drilling fluid to obtain an oil-based plugging drilling fluid.

Application Example 8

The coated rubber particle obtained in Example 6 was added in an amount of 3% by mass and the fibrous material was added in an amount of 2% by mass into the oil-based drilling fluid to obtain an oil-based plugging drilling fluid.

Application Example 9

The coated rubber particle obtained in Example 7 was added in an amount of 2% by mass, the coated rubber particle obtained in Example 8 was added in an amount of 2% by mass and the fibrous material was added in an amount of 1% by mass into the oil-based drilling fluid to obtain an oil-based plugging drilling fluid.

Application Example 10

The coated rubber particle obtained in Example 10 was added in an amount of 3% by mass, the coated rubber particle obtained in Example 7 was added in an amount of 1% by mass and the fibrous material was added in an amount of 1% by mass into the oil-based drilling fluid to obtain an oil-based plugging drilling fluid.

Application Example 11

The coated rubber particle obtained in Example 11 was added in an amount of 5% by mass into the oil-based drilling fluid to obtain an oil-based plugging drilling fluid.

Application Example 12

The coated rubber particle obtained in Example 12 was added in an amount of 5% by mass into the oil-based drilling fluid to obtain an oil-based plugging drilling fluid.

Comparative Example 1

Rubber particle A was added in an amount of 5% by mass into the oil-based drilling fluid to obtain an oil-based plugging drilling fluid.

Comparative Example 2

Rubber particle A was added in an amount of 3% by mass and the fibrous material was added in an amount of 2% by mass into the oil-based drilling fluid to obtain an oil-based plugging drilling fluid. A plugging evaluation simulation experiment device was used to evaluate the plugging performance of the oil-based plugging drilling fluid obtained in the examples and the comparative examples. The experimental method was as follows: 3 L of the oil-based plugging drilling fluid was added into the plugging simulation device, the effect for plugging a wedge-shaped crack with a width of 5 mm×4 mm was evaluated at a temperature of 150° C. and a pressure of 5 MPa, and the change of pressure was recorded as a function of time.

TABLE 1

Plugging performance of different oil-based plugging drilling fluids

| Plugging drilling fluid | Pressure, MPa | | | | |
|---|---|---|---|---|---|
| | 5 min | 30 min | 2 h | 8 h | 24 h |
| Application Example 1 | 4.8 | 4.7 | 4.5 | 4.4 | 4.2 |
| Application Example 2 | 4.8 | 4.7 | 4.7 | 4.5 | 4.4 |
| Application Example 3 | 4.8 | 4.7 | 4.6 | 4.5 | 4.3 |
| Application Example 4 | 4.8 | 4.7 | 4.6 | 4.5 | 4.4 |
| Application Example 5 | 4.9 | 4.8 | 4.7 | 4.6 | 4.4 |
| Application Example 6 | 4.6 | 4.5 | 4.4 | 4.3 | 4.2 |
| Application Example 7 | 4.8 | 4.7 | 4.6 | 4.4 | 4.3 |
| Application Example 8 | 4.9 | 4.7 | 4.6 | 4.5 | 4.4 |
| Application Example 9 | 4.9 | 4.8 | 4.7 | 4.6 | 4.4 |
| Application Example 10 | 5.0 | 4.9 | 4.8 | 4.7 | 4.6 |
| Application Example 11 | 4.8 | 4.6 | 4.3 | 4.0 | 3.8 |
| Application Example 12 | 4.8 | 4.6 | 4.4 | 4.2 | 4.0 |
| Comparative Example 1 | 4.8 | 4.6 | 4.3 | 4.0 | 2.3 |
| Comparative Example 2 | 4.9 | 4.6 | 4.4 | 4.1 | 2.6 |

As can be seen from the data listed in Table 1, compared with the comparative examples, the coated rubber particle of the present application shows better pressure-bearing plugging performance under elevated temperature and pressure conditions and smaller pressure drop under long-time pressure-bearing conditions, which indicates that the coated rubber particle has better long-term pressure-bearing capacity in oil-based drilling fluids. The experimental data also indicate that a combined use of coated particles with different particle sizes or a combined use of a coated particle with a fibrous materials shows better pressure-bearing performance; when only coated rubber particles of 3-5 mm are used, large particles easily accumulate at the opening of the crack with a width of 5 mm, and thus cannot enter the crack, and the pressure-bearing capability is slightly low; according to the ⅓-⅔ bridging theory, coated rubber particles of 1-3 mm can easily enter the crack, form bridges and accumulate in the crack, so that a compact pressure-bearing plugging layer can be formed.

The invention claimed is:

1. A coated rubber particle, comprising a rubber core and a coating layer,
   wherein the rubber core has a fluorine content (at %) of 0-15%, the coating layer has a fluorine content (at %) of 30-80%, and the coated rubber particle has a 24-hour oil absorption rate of 4%, and
   wherein the coating layer comprises inorganic particles and a fluoropolymer, and a ratio of the content (at %) of high-valence metal in the coating layer to the content (at %) of high-valence metal in the core is 1.2 to 10.

2. The coated rubber particle according to claim 1, wherein the core has a fluorine content (at %) of 0-8%, and/or the coating layer has a fluorine content (at %) of 40-65%, and the coated rubber particle has a 24-hour oil absorption rate of 1.5-2.5%.

3. The coated rubber particle according to claim 1, wherein the ratio of the content (at %) of high-valence metal in the coating layer to the content (at %) of high-valence metal in the core is 1.2 to 3, and/or the high-valence metal is at least one selected from the group consisting of aluminum, calcium, titanium, magnesium, barium and silicon, and/or the content (at %) of high-valence metal in the coating layer is 0.15-0.50%, and/or the content (at %) of high-valence metal in the core is 0.05-0.2%, and/or the coating layer has a metal-to-carbon ratio A (atomic ratio) of 0.003-0.01, and/or the core has a metal-to-carbon ratio B (atomic ratio) of 0.0008-0.003, and/or the ratio of the metal-to-carbon ratio A to the metal-to-carbon ratio B is 2-13, and/or the coating layer has a fluorine-to-carbon ratio (atomic ratio) of 1-3, and/or the core has a fluorine-to-carbon ratio (atomic ratio) of 0-0.25-(preferably 0-0.12).

4. The coated rubber particle according to claim 3, wherein the high-valence metal is calcium, and/or the content (at %) of high-valence metal in the coating layer is 0.20-0.30%, and/or the content (at %) of high-valence metal in the core is 0.10-0.15%, and/or the coating layer has a metal-to-carbon ratio A (atomic ratio) of 0.004-0.008, and/or the core has a metal-to-carbon ratio B (atomic ratio) of 0.001-0.002, and/or the ratio of the metal-to-carbon ratio A to the metal-to-carbon ratio B is 3-6, and/or the coating layer has a fluorine-to-carbon ratio (atomic ratio) of 1.2-1.8, and/or the core has a fluorine-to-carbon ratio (atomic ratio) of 0-0.12.

5. The coated rubber particle according to claim 1, wherein the rubber is at least one selected from the group consisting of natural rubber, synthetic rubber and composites thereof, and/or the inorganic particles are an inorganic nanoparticles, and/or fluoropolymer is a fluorinated polyolefin.

6. The coated rubber particle according to claim 5, wherein the inorganic particles are at least one selected from the group consisting of calcium carbonate nanoparticle, silica nanoparticle, alumina nanoparticle and silica-alumina nanoparticle, and/or the fluoropolymer is comprises one or more selected from the group consisting of tetrafluoroethylene homopolymers, tetrafluoroethylene copolymers, vinylidene fluoride homopolymers, vinylidene fluoride copolymers, hexafluoropropylene homopolymers and hexafluoropropylene copolymers.

7. The coated rubber particle according to claim 1, wherein the weight ratio of the inorganic particle to the core is 0.01-0.12, and/or the weight ratio of the fluoropolymer to the core is 0.015-0.06, and/or the coated rubber particle has an average particle size of 0.5-20 mm, and/or the inorganic particle has an average particle size of 10-500 nm, and/or the coating layer has such a thickness that the 24-hour oil absorption rate of the coated rubber particle is reduced by 20% to 60% as compared to the case without the coating layer, and/or, the coating layer has a thickness of 0.05-500 micrometers, and/or the 24-hour oil absorption rate of the coated rubber particle is reduced by 20% to 60% as compared to the case without the coating layer.

8. The coated rubber particle according to claim 7, wherein the weight ratio of the inorganic particle to the core is 0.02-0.05, and/or the weight ratio of the fluoropolymer to the core is 0.025-0.04, and/or the coated rubber particle has an average particle size of 1-5 mm, and/or the inorganic particle has an average particle size of 50-200 nm, and/or the coating layer has such a thickness that the 24-hour oil absorption rate of the coated rubber particle is reduced by 35-60% as compared to the case without the coating layer, and/or, the coating layer has a thickness of 20-200 micrometers, and/or the 24-hour oil absorption rate of the coated rubber particle is reduced by 35-60% as compared to the case without the coating layer.

9. A drilling fluid composition, comprising a plugging material and a base slurry, wherein the plugging material comprises or is the coated rubber particle according to claim 1.

10. The drilling fluid composition according to claim 9, wherein the content by mass of the coated rubber particle is 2-12 wt %, based on the total amount of the drilling fluid composition taken as 100 wt %.

11. The drilling fluid composition according to claim 10, wherein the content by mass of the coated rubber particle is 3-8 wt %, based on the total amount of the drilling fluid composition taken as 100 wt %.

12. The drilling fluid composition according to claim 9, wherein the drilling fluid composition is an oil-based drilling fluid composition, and/or, the base slurry is one or more selected from the group consisting of white oil-based drilling fluid base slurry, diesel oil-based drilling fluid base slurry and synthetic based drilling fluid base slurry.

* * * * *